(12) United States Patent
Jiang et al.

(10) Patent No.: US 11,356,023 B2
(45) Date of Patent: Jun. 7, 2022

(54) SEQUENCE ASSIGNMENT METHOD USED IN MULTIPHASE SWITCHING CONVERTERS WITH DAISY CHAIN CONFIGURATION

(71) Applicant: Chengdu Monolithic Power Systems Co., Ltd., Chengdu (CN)

(72) Inventors: Lijie Jiang, Hangzhou (CN); Yongheng Sun, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 63 days.

(21) Appl. No.: 16/934,328

(22) Filed: Jul. 21, 2020

(65) Prior Publication Data

US 2021/0028704 A1 Jan. 28, 2021

(30) Foreign Application Priority Data

Jul. 26, 2019 (CN) .......................... 201910686310.6

(51) Int. Cl.
*H02M 3/158* (2006.01)
(52) U.S. Cl.
CPC ........ *H02M 3/1584* (2013.01); *H02M 3/1586* (2021.05)
(58) Field of Classification Search
None
See application file for complete search history.

(56) References Cited

U.S. PATENT DOCUMENTS

| | | | |
|---|---|---|---|
| 8,493,044 B2 | 7/2013 | Xu et al. | |
| 9,436,261 B2* | 9/2016 | Yun | ........................ G06F 1/3212 |
| 9,912,240 B1 | 3/2018 | Nguyen et al. | |
| 10,270,343 B2 | 4/2019 | Nguyen et al. | |
| 10,318,918 B2* | 6/2019 | Wang | .................... G09G 3/3648 |
| 10,915,080 B2* | 2/2021 | Song | ..................... G01R 31/396 |

\* cited by examiner

*Primary Examiner* — Jeffrey A Gblende
(74) *Attorney, Agent, or Firm* — Perkins Coie LLP

(57) ABSTRACT

A sequence assignment method used in multiphase switching converters with daisy chain configuration, wherein the multiphase switching converter includes a plurality of switching circuits coupled in parallel, and a plurality of control circuits configured in a daisy chain and sharing a phase control signal. Each control circuit generates a phase output signal, and a switch control signal for controlling a corresponding switching circuit based on a phase input signal and the phase control signal. The sequence assignment method includes: configuring one of the control circuits as a master control circuit to provide the phase control signal, wherein the phase control signal has a plurality of pulses for successively triggering the plurality of switching circuits to provide power to a load; respectively configuring the rest of the control circuits as a slave control circuit to receive the phase control signal; modulating the plurality of pulses in the phase control signal, through the master control circuit, to respectively generate a sequence information for each slave control circuit; and obtaining the sequence information, through each of the slave control circuits, based on the received phase input signal and the phase control signal.

29 Claims, 13 Drawing Sheets

SEQUENCE ASSIGNMENT METHOD USED IN MULTIPHASE SWITCHING CONVERTERS WITH DAISY CHAIN CONFIGURATION

CROSS-REFERENCE TO RELATED APPLICATIONS

This application claims the benefit of CN application 201910686310.6, filed on Jul. 26, 2019, and incorporated herein by reference.

TECHNICAL FIELD

The present invention generally relates to electronic circuits, and more particularly but not exclusively, to multiphase switching converters.

BACKGROUND

In recent years, multiphase switching converters with outstanding performance in thermal, EMI and load transient response are widely used in power solutions for central processing units (CPUs).

The number of phases in the multiphase switching converter is determined by the load, and needs to be increased when current required by the load increases. For multiphase switching converters with single controller, this means logic, circuit, structure and size of the controller all need to be adjusted, which undoubtedly increases the burden of system development and overall cost.

SUMMARY

Embodiments of the present invention are directed to a multiphase switching converter comprising: a plurality of switching circuits coupled in parallel between an input voltage and a load; and a plurality of control circuits configured in a daisy chain, wherein each of the control circuits has a first terminal, a second terminal and a third terminal, and is respectively coupled to a corresponding one of the plurality of switching circuits for providing a switch control signal. The first terminals of the plurality of control circuits are coupled together to share a phase control signal, the second terminal of each control circuit is coupled to a previous control circuit in the daisy chain to receive a phase input signal, and the third terminal of each control circuit is coupled to a latter control circuit in the daisy chain to provide a phase output signal. One of the plurality of control circuits is configured as a master control circuit to provide the phase control signal, the rest of the plurality of control circuits are respectively configured as a slave control circuit to receive the phase control signal. The phase control signal includes a plurality of pulses for successively triggering the plurality of switching circuits to provide power to the load. The plurality of pulses are modulated to respectively generate a corresponding sequence information for each slave control circuit, and each slave control circuit obtains the corresponding sequence information based on the received phase input signal and phase control signal.

Embodiments of the present invention are also directed to a sequence assignment method used in a multiphase switching converter. The sequence assignment method comprises: configuring one of the control circuits as a master control circuit to provide the phase control signal, wherein the phase control signal has a plurality of pulses for successively triggering the plurality of switching circuits to provide power to the load; respectively configuring the rest of the plurality of control circuits as a slave control circuit to receive the phase control signal; modulating the plurality of pulses in the phase control signal, through the master control circuit, to respectively generate a corresponding sequence information for each slave control circuit; and obtaining the corresponding sequence information, through each slave control circuit, based on the received phase input signal and the phase control signal.

Embodiments of the present invention are further directed to a control circuit used in a multiphase switching converter, wherein the multiphase switching converter includes a plurality of switching circuits coupled in parallel, and a plurality of control circuits configured in a daisy chain and respectively coupled to a corresponding one of the plurality of switching circuits. The control circuit comprises: a first terminal configured to share a phase control signal with the rest of the plurality of control circuits; a second terminal configured to receive a phase input signal from a previous control circuit in the daisy chain; and a third terminal configured to provide a phase output signal to a latter control circuit in the daisy chain. If the control circuit is configured as a master control circuit, it will provide the phase control signal at the first terminal, and modulate a plurality of pulses in the phase control signal to respectively generate a corresponding sequence information for each slave control circuit in the daisy chain. If the control circuit is configured as a slave control circuit, it will receive the phase control signal at the first terminal, and obtain the corresponding sequence information based on the phase input signal and phase control signal.

Embodiments of the present invention are still further directed to a control method used in a control circuit of a multiphase switching converter. The control method comprises: determining whether the control circuit is configured as a master control circuit or a slave control circuit. If the control circuit is configured as a master control circuit, providing the phase control signal at the first terminal of the control circuit, and modulating a plurality of pulses in the phase control signal to respectively generate a corresponding sequence information for each slave control circuit in the daisy chain. If the control circuit is configured as a slave control circuit, receiving the phase control signal at the first terminal of the control circuit, and obtaining the corresponding sequence information based on the received phase input signal and phase control signal.

Embodiments of the present invention are also further directed to a control circuit used in a multiphase switching converter, wherein the multiphase switching converter includes a plurality of switching circuits coupled in parallel and a plurality of control circuits configured in a daisy chain. The control circuit comprises: a first terminal configured to share a phase control signal with the rest of the plurality of control circuits; a second terminal configured to receive a phase input signal from a previous control circuit in the daisy chain; and a third terminal configured to provide a phase output signal to a latter control circuit in the daisy chain; wherein the control circuit is configured to generate the phase output signal, and a switch control signal for controlling a corresponding one of the plurality of switching circuits based on the phase input signal and phase control signal. If the control circuit is configured as a master control circuit, it will provide the phase control signal at the first terminal. The phase control signal includes a plurality of pulses for successively triggering the plurality of switching circuits, and the plurality of pulses includes a first pulse with a pulse width larger than the pulse width of the rest of the plurality of pulses. The pulse width of the rest of the plurality of pulses are the same.

BRIEF DESCRIPTION OF THE DRAWING

The present invention can be further understood with reference to the following detailed description and the appended drawings, wherein like elements are provided with like reference numerals.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Reference to "one embodiment", "an embodiment", "an example" or "examples" means: certain features, structures, or characteristics are contained in at least one embodiment of the present invention. These "one embodiment", "an embodiment", "an example" and "examples" are not necessarily directed to the same embodiment or example. Furthermore, the features, structures, or characteristics may be combined in one or more embodiments or examples. In addition, it should be noted that the drawings are provided for illustration, and are not necessarily to scale. And when an element is described as "connected" or "coupled" to another element, it can be directly connected or coupled to the other element, or there could exist one or more intermediate elements. In contrast, when an element is referred to as "directly connected" or "directly coupled" to another element, there is no intermediate element. When a signal is described as "equal to" another signal, it is substantially identical to the other signal.

Figure 1:
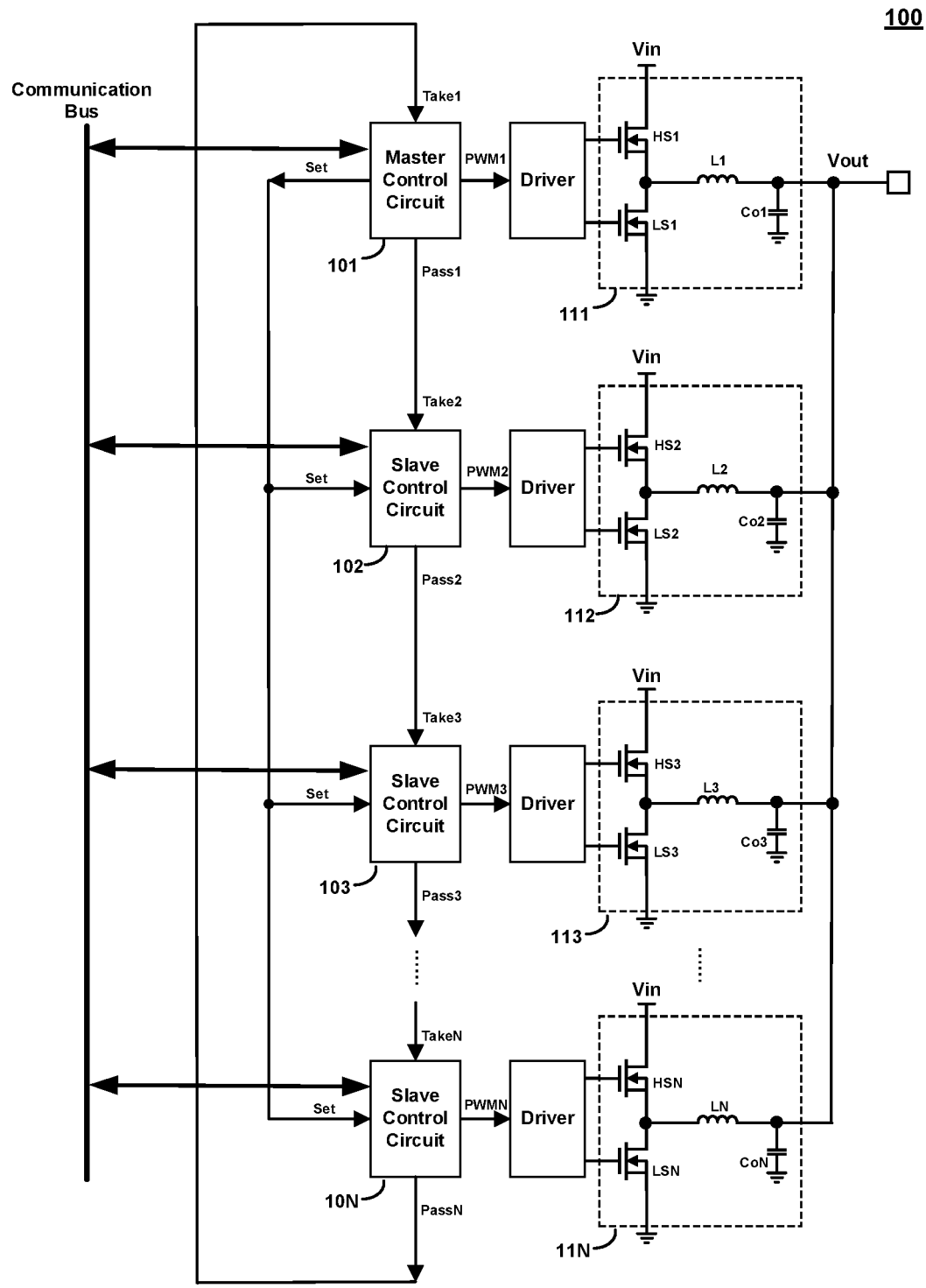
FIG. 1 is a schematic block diagram of a multiphase switching converter 100 in accordance with an embodiment of the present invention.

FIG. 1 is a schematic block diagram of a multiphase switching converter 100 in accordance with an embodiment of the present invention. It includes a plurality of switching circuits 111~11N coupled in parallel, and a plurality of control circuits 101~10N configured in a daisy chain, wherein N is an integer greater than 1. Each of the switching circuits has an input terminal coupled to an input voltage Vin and an output terminal coupled to a load to provide an output voltage Vout. The control circuits 101~10N are respectively coupled to one of the switching circuits 111~11N. Each control circuit $10i$ ($i$=1, 2, . . . , N) has a first terminal, a second terminal and a third terminal, wherein the first terminal is coupled with the first terminals of the rest of control circuits to share a phase control signal Set, the second terminal of the control circuit $10i$ is coupled to the third terminal of a previous control circuit in the daisy chain to receive a phase input signal Takei, and the third terminal of the control circuit $10i$ is coupled to the second terminal of a latter control circuit in the daisy chain to provide a phase output signal Passi. Based on the phase input signal Takei and the phase control signal Set, the control circuit $10i$ generates the phase output signal Passi, and a switch control signal PWMi for controlling the corresponding switching circuit $11i$. In some embodiments, the switching circuit $11i$ is configured in synchronous BUCK (also called "step-down circuit"), which includes a high side transistor HSi, a low side transistor LSi, an inductor Li and an output capacitor Coi. When the switch control signal PWMi is logical high, the high side transistor HSi is on and the low side transistor LSi is off. When the switch control signal PWMi is logical low, the high side transistor HSi is off and the low side transistor LSi is on. Of course, there might be dead time intentionally involved to avoid shoot through of the high side and low side transistors.

Among the control circuits 101~10N, 101 is configured as a master control circuit to provide the phase control signal Set at its first terminal. The phase control signal Set includes a plurality of pulses, such as PULSE 1~PULSE N, for successively triggering the plurality of switching circuits to provide power to the load. Generally speaking, the switch control signals PWM1~PWMN are respectively synchronized with the plurality of pulses PULSE 1~PULSE N. For example, the rising edge of the switch control signal PWMi is synchronized with the rising edge of PULSE i, so that the high side transistor HSi is turned on and the low side transistor LSi is turned off at the rising edge of PULSE i, and the corresponding switching circuit 11i is triggered to provide power to the load. In some embodiments, PULSE 1~PULSE N are further modulated to generate a sequence information for each of the control circuits. The sequence information is indicative of a sequence number, which is used to distinguish the control circuits in daisy chain. In a N-phase converter, the sequence number is usually expressed as numbers 1, 2, ..., and N. The sequence number could correspond to physical connection sequence of the plurality of control circuits in daisy chain. In some embodiments, the sequence number 1, 2, ..., and N respectively correspond to the first, second, ..., and $N^{th}$ phase started from the phase of the master control circuit. However, this is not limiting, and the sequence number could also be independent from and irrelevant to the physical connection sequence.

Because of the daisy chain architecture, users can easily change the number of phases in multiphase switching converter according to practical requirements. If more phases are required, the users only need to add new control circuits and corresponding components into the daisy chain, with very simple adjustment of electrical connections.

Figure 2:
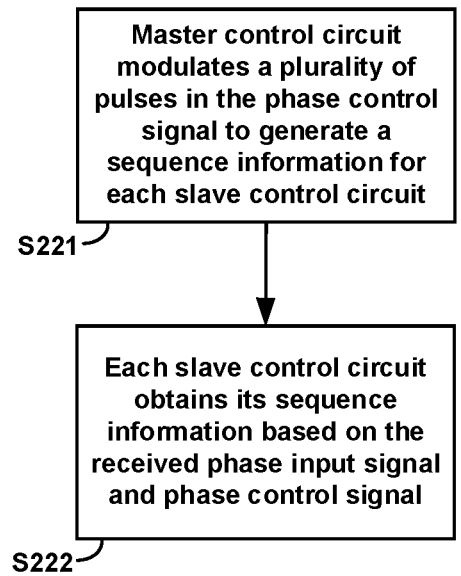
FIG. 2 is a flowchart of a sequence assignment method used in the multiphase switching converter 100 in accordance with an embodiment of the present invention.

FIG. 2 is a flowchart of a sequence assignment method used in the multiphase switching converter 100 in accordance with an embodiment of the present invention. It includes steps S221 and S222. In step S221, the master control circuit 101 modulates the plurality of pulses in the phase control signal Set, such as modulating a pulse width or a pulse amplitude of the pulses, to generate a sequence information for each of the slave control circuits. In step S222, based on the received phase input signal and phase control signal Set, each of the slave control circuits obtains its own sequence information.

FIG. 3A~3D show operation waveforms of the multiphase switching converter 100 under different signal modulation schemes in accordance with embodiments of the present invention. In the embodiment shown in FIG. 3A, PULSE 1~PULSE N in the phase control signal Set are modulated to have different pulse width, which can be expressed as $$t_{set\_on} = T_{SET} + j*T_{OFFSET} \quad (1)$$

wherein $T_{SET}$ is a preset pulse width, $T_{OFFSET}$ is an offset value, j=1, 2, ..., N. The slave control circuits 102 to 10N respectively sample a pulse in the phase control signal Set based on the corresponding phase input signal, and obtain the corresponding sequence information in accordance with the pulse width of the sampled pulse. For example, the slave control circuit 102 samples the phase control signal Set based on its phase input signal Take2 to get PULSE 1, and then deduces j=1 based on the pulse width of PULSE 1 and Equation (1). Based thereupon, the slave control circuit 102 could get its sequence information, such as number "2", which indicates that the slave control circuit 102 belongs to the second phase.

Figure 3A:
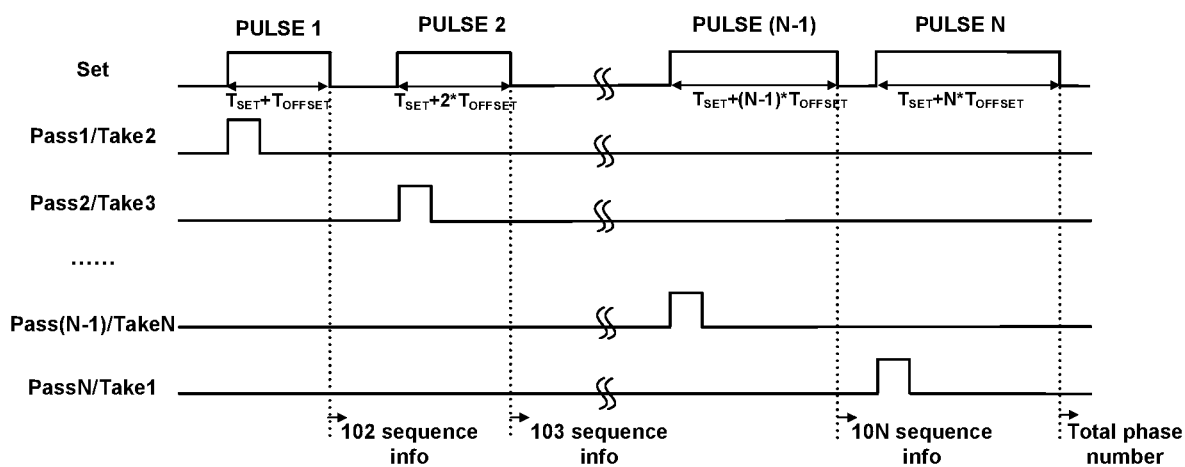
FIG. 3A~3D show operation waveforms of the multiphase switching converter 100 under different signal modulation schemes in accordance with embodiments of the present invention.

Although in the embodiment shown in FIG. 3A, the pulse width of PULSE 1~PULSE N are generated according to Equation (1), it could be understood by those skilled in the art that this is not intended to limit the invention. The pulse width of the pulses can be determined in other ways, as long as they are different from each other, and the corresponding sequence information can be resolved by the slave control circuits according to a predetermined relationship.

Figure 3B:
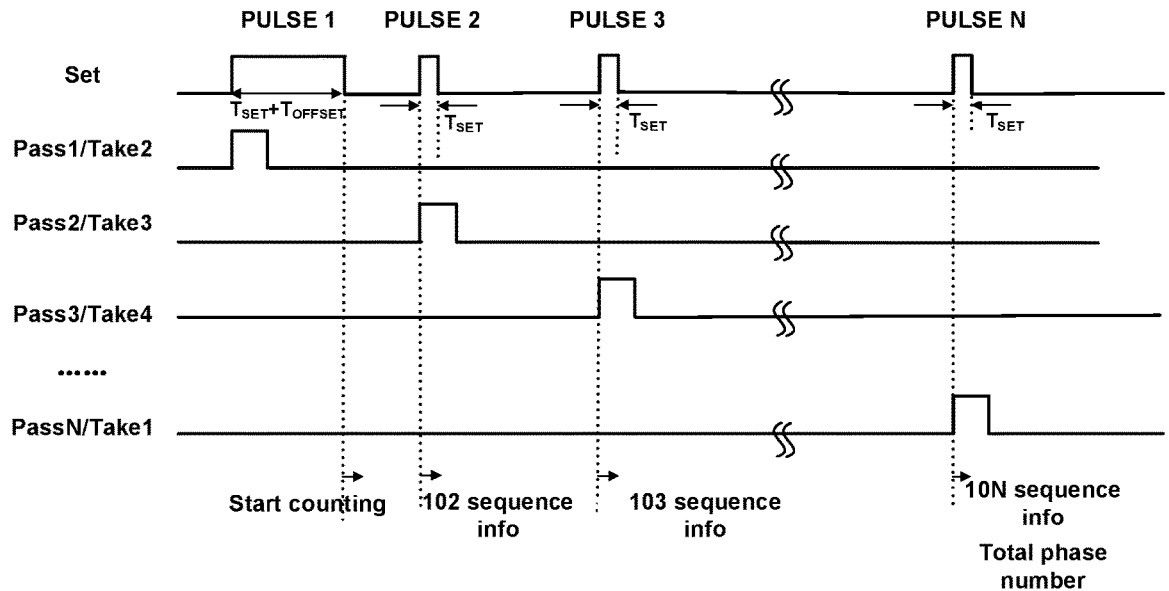

FIG. 3B illustrates a signal modulation scheme in accordance with another embodiment of the present invention. PULSE 1 in the phase control signal Set is modulated to have pulse width different from the rest of pulses. For instance, the pulse width of PULSE 1 is set to ($T_{SET}$+$T_{OFFSET}$), and the pulse width of PULSE 2~PULSE N are all set to $T_{SET}$. The slave control circuits 102 to 10N monitor the phase control signal Set, and start counting the pulses when PULSE 1 is detected. The sequence information is then obtained based on the phase input signal and count value. Take the slave control circuit 103 as an example, in one embodiment, the slave control circuit 103 monitors the pulse width of each pulse in the phase control signal Set, to determine whether it is greater than $T_{SET}$. When the pulse width is found to be larger than $T_{SET}$ at the falling edge of PULSE 1, counting is started. At the falling edge of PULSE 1, the count value is 0; at the rising edge of PULSE 2, the count value changes into 1. At the rising edge of PULSE 3, the count value becomes 2. Based on the phase input signal Take3, the slave control circuit 103 samples the count value (e.g., at the rising edge of the PULSE 3), to get a value such as 2. Then based on the sampled value, the sequence information of the slave control circuit 103 is obtained, for example, as number "3", which indicates the slave control circuit 103 belongs to the third phase.

Although in the embodiment of FIG. 3B, the pulse width of PULSE 1 is larger than that of the other pulses, it can be understood by those skilled in the art that this is not used to limit the invention. The pulse width of PULSE 1 could also be smaller than that of the other pulses, as long as PULSE 1 can be distinguished by the slave control circuits among the plurality of pulses.

Figure 3C:
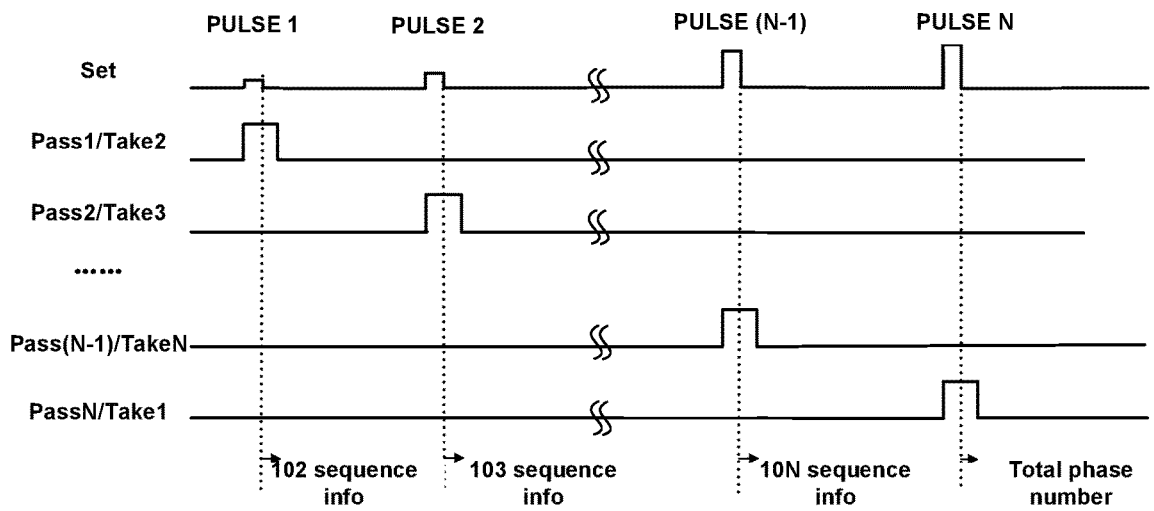
Figure 3D:
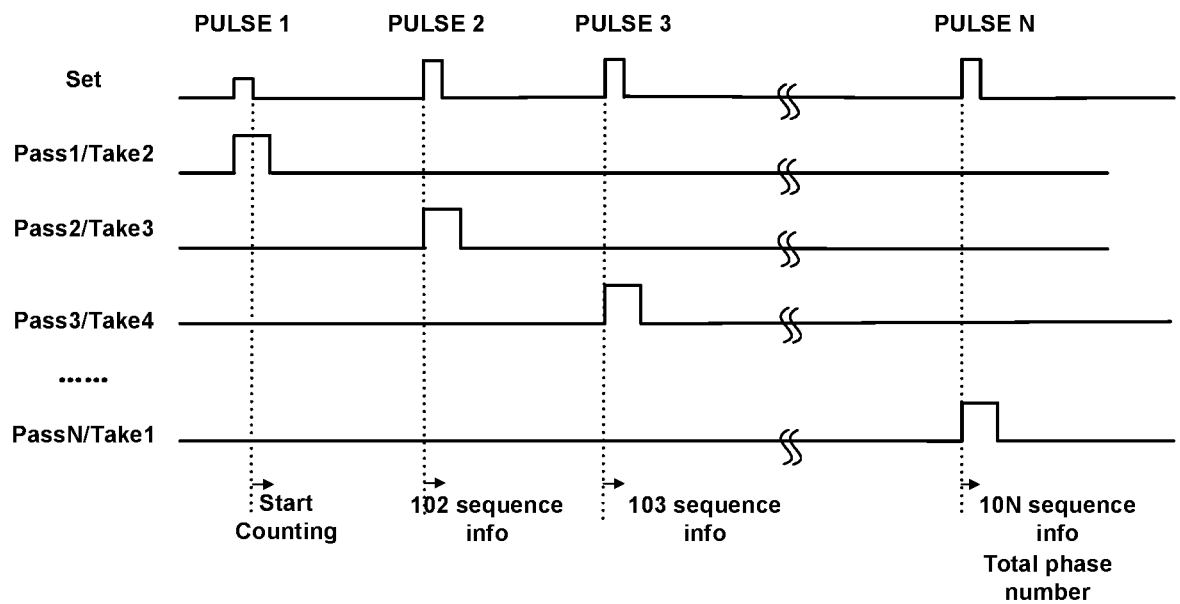

In addition to pulse width, pulse amplitude could also be modulated. For example, as shown in FIG. 3C, PULSE 1~PULSE N have different pulse amplitude from each other. One of them is sampled by the slave control circuit based on the phase input signal, and the sequence information is then obtained according to the pulse amplitude of the sampled pulse. Further as shown in FIG. 3D, PULSE 1 is modulated to have a pulse amplitude different from the other pulses, so that the slave control circuit can recognize it based on its pulse amplitude.

In the embodiments of FIG. 3A~3D, Take2 is synchronized with PULSE 1, Take3 is synchronized with PULSE 2, Take4 is synchronized with PULSE 3, ..., Take1 is synchronized with PULSE N. It should be noted that, however, this is not intended to limit the invention. According to internal logic adopted by the control circuits, the signals Take1~TakeN can also be synchronized with PULSE 1~PULSE N respectively, or have other phase relationship there between. In these cases, the sequence information can also be deduced from the phase control signal Set through ways similar to those shown in FIG. 3A~3D. These variations are easy to be understood by those skilled in the art, and therefore do not depart from the scope of the present invention.

The sequence information of the control circuits can be used in phase shedding (or called "phase cutting") control of the multiphase switching converter, so the converter could determine the number of working phases based on the load current. When the load current is small, only part of the plurality of switching circuits work and provide power to the load, while the other switching circuits are disabled to reduce switching loss.

In one embodiment, all the control circuits are coupled to a communication bus, and are able to communicate with a host controller through the communication bus. Based on the load current, the host controller decides whether to conduct phase shedding and generates a phase shedding command. The slave control circuit receives the phase shedding command from the host controller through the communicate bus, and determines whether to enter into a phase shedding mode based on its sequence information and the content of the phase shedding command (e.g. the expected number of working phases). If the slave control circuit determines to enter the phase shedding mode, the corresponding switching circuit will be disabled and stop providing power to the load. And the phase output signal of the salve control circuit will become equal to its phase input signal.

The communication bus mentioned above could be $I^2C$, SPI, SCI, UART, and other commonly used buses. PMBUS or SMBUS protocol can be adopted when $I^2C$ bus is used. Of course, in some applications, the phase shedding command can be directly generated by the master control circuit without the help of a host controller.

In some embodiments, the control circuit itself can decide whether to perform phase shedding based on the load current. It can generate a current threshold according to its sequence information, and compare the load current with the current threshold to determine whether to stop the corresponding switching circuit from providing power to the load.

Figure 4:
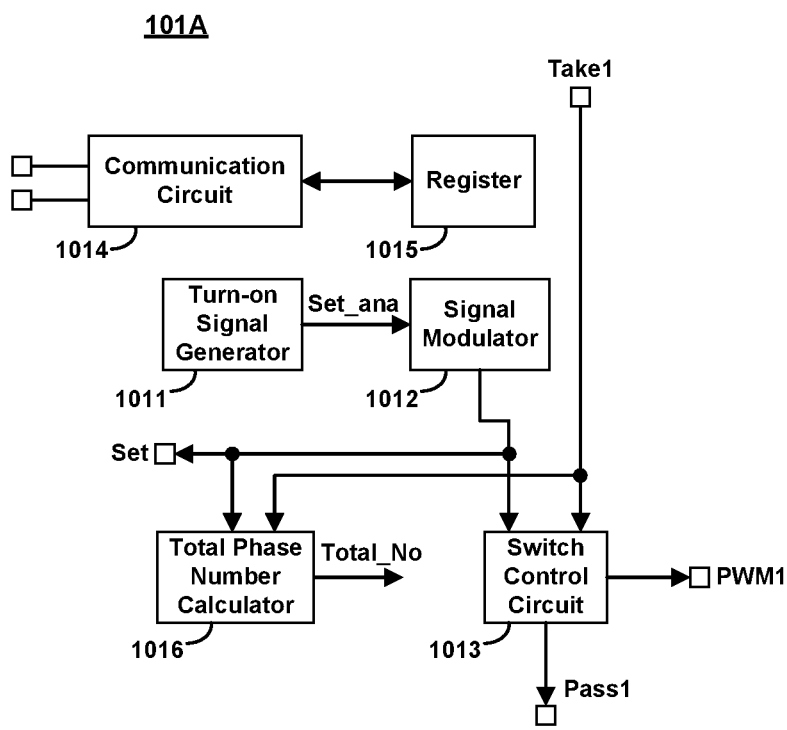
FIG. 4 is a schematic block diagram of a master control circuit 101A in accordance with an embodiment of the present invention.

FIG. 4 is a schematic block diagram of a master control circuit 101A in accordance with an embodiment of the present invention. It includes a turn-on signal generator 1011, a signal modulator 1012, and a switch control circuit 1013. The turn-on signal generator 1011 generates a turn-on control signal Set_ana. The signal modulator 1012 is coupled to the turn-on signal generator 1011 to receive the turn-on control signal Set_ana, and configured to generate the phase control signal Set based thereupon. The switch control circuit 1013 is coupled to the signal modulator 1012, and is configured to generate the switch control signal PWM1 and the phase output signal Pass1 based on the phase control signal Set and the phase input signal Take1. The turn-on control signal Set_ana can be generated through comparing the output voltage Vout of the multiphase switching converter with a reference signal. It could also be a periodical clock signal produced by an oscillator.

In some embodiments, the master control circuit 101A further includes a communication circuit 1014 for information exchange with the communication bus, and a register circuit 1015 for storing data in the master control circuit. In addition, in some embodiments, the master control circuit 101A could further include a total phase number calculator 1016. Based on the phase input signal Take1 and the phase control signal Set, the total phase number calculator 1016 obtains the total phase number, Total_No, of the multiphase switching converter. For example, in the embodiments shown in FIG. 3A~3D, the master control circuit 101A can count the pulses in the phase control signal Set and obtain the total phase number based on the count value and the phase input signal Take1. In the embodiments shown in FIG. 3A and FIG. 3C, the master control circuit 101A can also sample the phase control signal Set based on the phase input signal Take1 to get PULSE N, and then deduce the total phase number based on the pulse width or pulse amplitude of the PULSE N. If needed, the total phase number Total_No can be uploaded to the host controller through the communication bus.

Figure 5:
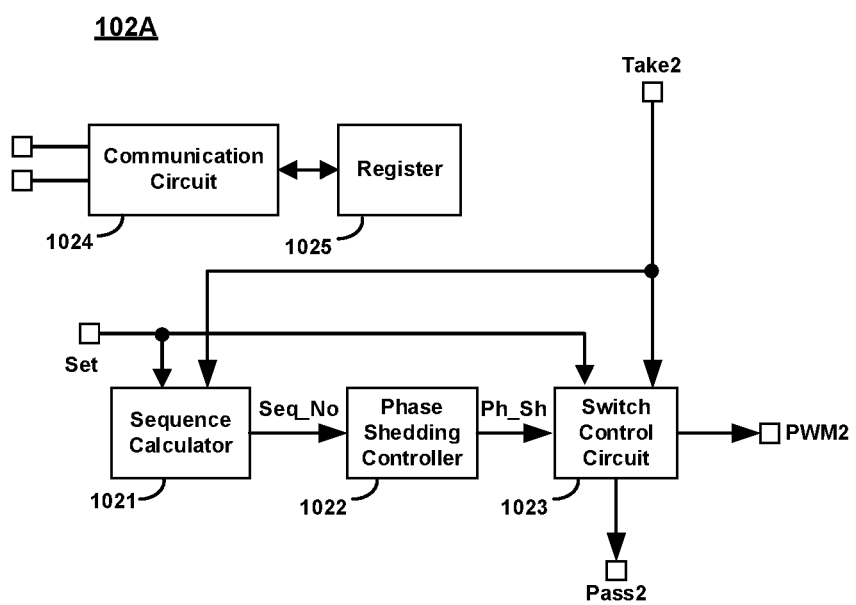
FIG. 5 is a schematic block diagram of a slave control circuit 102A in accordance with an embodiment of the present invention.

FIG. 5 is a schematic block diagram of a slave control circuit 102A in accordance with an embodiment of the present invention. It includes a sequence calculator 1021, a phase shedding controller 1022, and a switch control circuit 1023. The sequence calculator 1021 obtains the sequence information Seq_No of the slave control circuit 102A based on the phase control signal Set and the phase input signal Take2. The switch control circuit 1023 generates the switch control signal PWM2 and the phase output signal Pass2 based on the phase control signal Set and the phase input signal Take2. The phase shedding controller 1022 is coupled to the sequence calculator 1021, and is configured to generate a phase shedding control signal Ph_Sh to control the switch control circuit 1023.

In some embodiments, the slave control circuit 102A further includes a communication circuit 1024 and a register circuit 1025, respectively used for information exchange and data storage.

Figure 6:
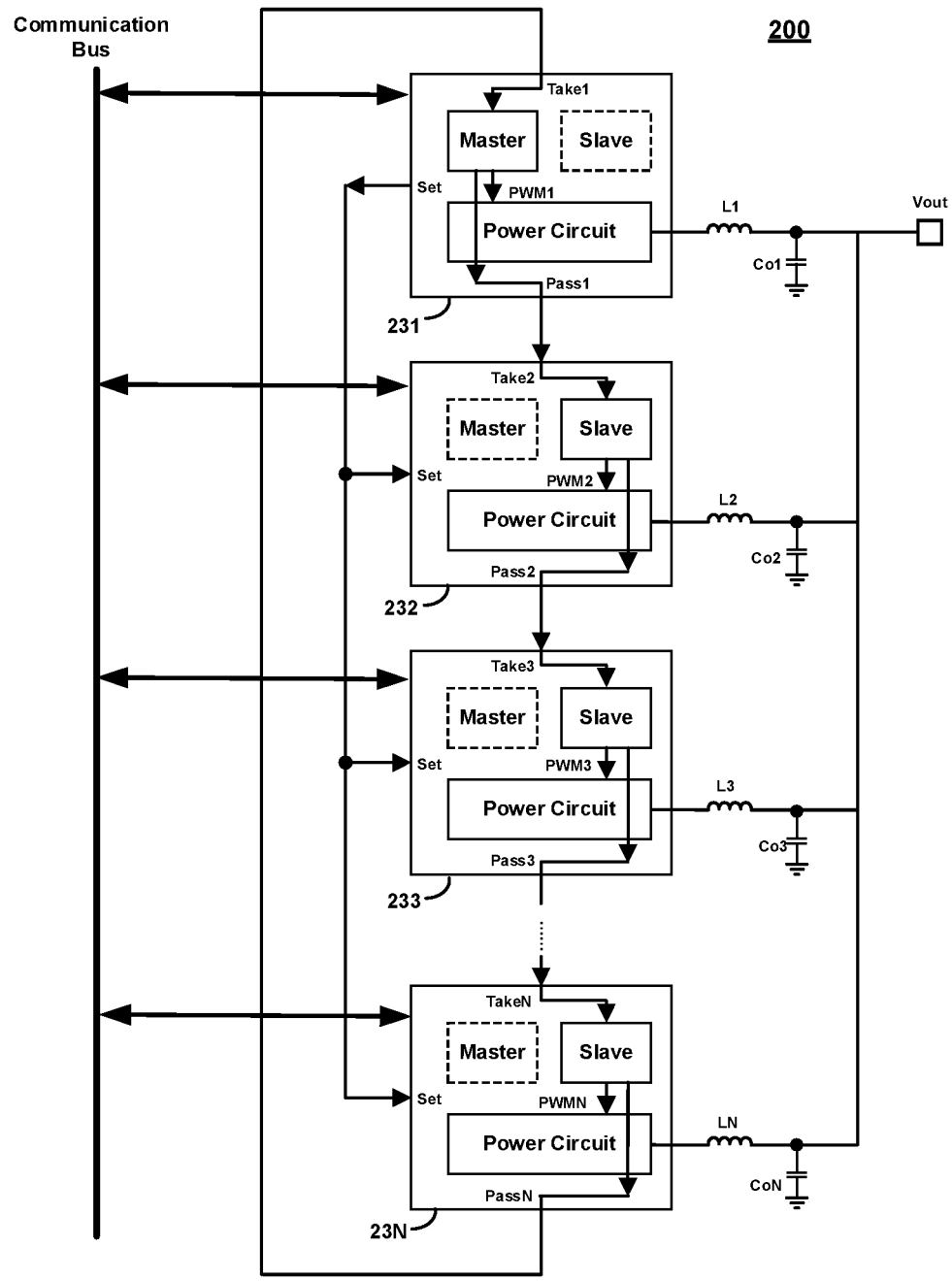
FIG. 6 is a schematic block diagram of a multiphase switching converter 200 in accordance with an embodiment of the present invention.

FIG. 6 is a schematic block diagram of a multiphase switching converter 200 in accordance with an embodiment of the present invention. It includes control ICs 231~23N with same internal structure. Each control IC integrates a master control circuit, a slave control circuit and a power circuit, wherein either the master control circuit or the slave control circuit is selectively enabled. For example, in the embodiment shown in FIG. 6, the control IC 231 is configured as a master control IC. Its master control circuit is enabled and its slave control circuit is disabled. Accordingly, the control ICs 232 to 23N are configured as slave control ICs, with their slave control circuits enabled and master control circuits disabled. The power circuit inside the control IC may include transistors and corresponding driver circuit, as shown in FIG. 1. Of course, in some embodiments, the power circuit could also be located outside of the control IC.

The master control circuit and slave control circuit in the control IC of FIG. 6 could adopt structures respectively similar to those shown in FIG. 4 and FIG. 5. However, to save circuit area and simplify circuit structure, the master control circuit and slave control circuit can reuse some functional blocks, e.g., the communication circuit, register circuit and switch control circuit. Moreover, there are many ways to configure the control IC as a master control IC or as a slave control IC. For instance, this configuration could be realized through adjusting voltage, current or resistance value of certain pins of the control IC.

Figure 7:
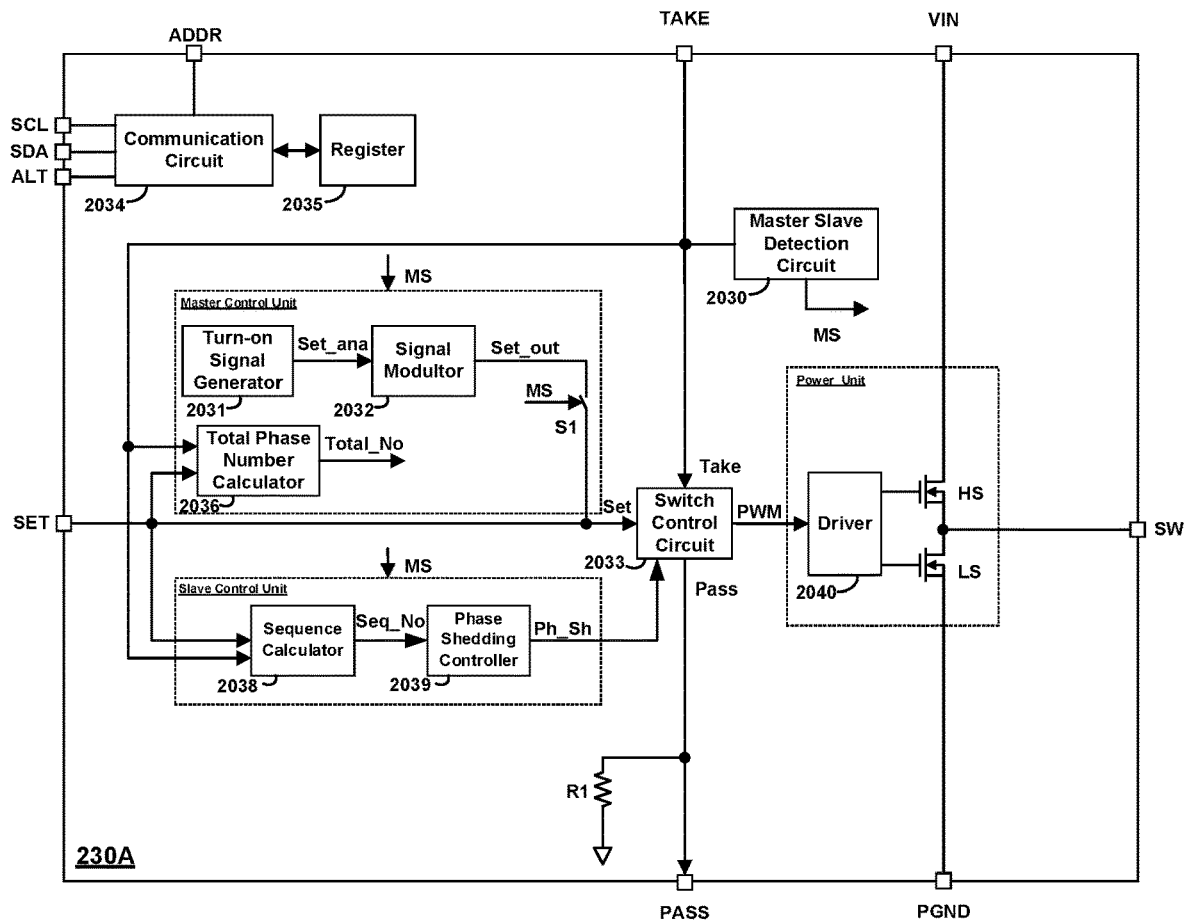
FIG. 7 is a schematic block diagram of a control IC 230A used in a multiphase switching converter in accordance with an embodiment of the present invention.

FIG. 7 is a schematic block diagram of a control IC 230A used in a multiphase switching converter in accordance with an embodiment of the present invention. The control IC 230A includes a master control unit, a slave control unit, a power unit, a master slave detection circuit 2030, a switch control circuit 2033, a communication circuit 2034, a register circuit 2035 and a plurality of pins. Pin SET is configured to share a phase control signal Set, pin TAKE is configured to receive a phase input signal Take, pin PASS is configured to provide a phase output signal Pass, pin VIN is configured to receive an input voltage Vin, pin PGND is couple to a power ground, and pin SW is coupled to a load through one or more external components.

The master control unit is configured to generate the phase control signal Set. The slave control unit is configured to obtain the sequence information Seq_No based on the phase input signal Take and the phase control signal Set. The power unit includes transistors HS and LS as well as a driver circuit 2040. The transistors HS and LS are coupled in series between pins VIN and PGND, and the connection node of transistors HS and LS is connected to pin SW. Based on the phase control signal Set and the phase input signal Take, the switch control circuit 2033 generates the phase output signal Pass, and a switch control signal PWM for controlling the transistors HS and LS. The master slave detection circuit 2030 determines whether the control IC is configured as a master control IC or a slave control IC, and generates a master slave detection signal MS to control the master control unit and the slave control unit.

In one embodiment, the master control unit includes a turn-on signal generator 2031, a signal modulator 2032 and a switch S1. The turn-on signal generator 2031 is configured to generate a turn-on control signal Set_ana. The signal modulator 2032 is coupled to the turn-on signal generator 2031, and configured to generate a preprocess signal Set_out based on the turn-on control signal Set_ana. The switch S1 has a first terminal, a second terminal and a control terminal, wherein the first terminal is coupled to the signal modulator 2032 to receive the preprocess signal Set_out, the second terminal is coupled to pin SET, and the control terminal is coupled to the master slave detection circuit 2030 to receive the master slave detection signal MS. In one embodiment, the master control unit further includes a total phase number calculator 2036, which obtains a total phase number, Total_No, of the multiphase switching converter based on the phase input signal Take and the phase control signal Set.

The slave control unit includes a sequence calculator 2038 and a phase shedding controller 2039. The sequence calculator 2038 is coupled to pins TAKE and SET to receive the phase input signal Take and the phase control signal Set, and is configured to obtain the sequence information Seq_No based on these two signals. The phase shedding controller 2039 is coupled to the sequence calculator 2038, wherein based on the sequence information Seq_No, the phase shedding controller 2039 generates a phase shedding control signal Ph_Sh to control the switch control circuit 2033.

The communication circuit 2034 is coupled a communication bus. In one embodiment, this communication bus is an I²C bus with PMBUS protocol. The control IC 230A further includes pins SCL, SDA, ALT for data communication, and pin ADDR for setting communication address of the control IC 230A. The register circuit 2035 is used to store data, such as instructions or commands from a host controller, intermediate or final data of digital calculation, and addresses, etc.

In one embodiment, the control IC 230A further includes a pull-down resistor R1 coupled between the pin PASS and a reference ground. In daisy chain architecture, the control IC 230A can be configured as a master control IC by connecting the pin TAKE to a power supply voltage Vcc through an external pull-up resistor. Alternatively, without such an external pull-up resistor connected to pin TAKE, the control IC 230A is configured as a slave control IC. When the control IC 230A is just powered on, it will set the pin PASS to a high-impedance state for a period of time. And during this time period, the master slave detection circuit 2030 monitors the voltage at the pin TAKE to determine whether the control IC is configured as a master control IC or a slave control IC. If the voltage at the pin TAKE is high, the control IC is set as a master control IC, else if the voltage at the pin TAKE is low, the control IC is set as a slave control IC.

Figure 8:
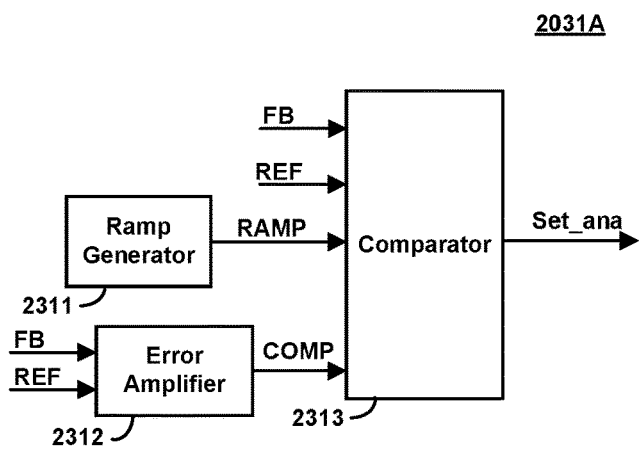
FIG. 8 is a schematic block diagram of a turn-on signal generator 2031A in accordance with an embodiment of the present invention.

FIG. 8 is a schematic block diagram of a turn-on signal generator 2031A in accordance with an embodiment of the present invention. The turn-on signal generator 2031A includes a ramp generator 2311, an error amplifier 2312 and a comparator 2313. The ramp generator 2311 is configured to provide a ramp signal RAMP. The error amplifier 2312 receives a reference signal REF and a feedback signal FB indicative of the output voltage Vout of the multiphase switching converter, and generates a compensation signal COMP based on these two signals. The comparator 2313 receives the feedback signal FB, the reference signal REF, the ramp signal RAMP and the compensation signal COMP, and generates the turn-on control signal Set_ana.

Figure 9:
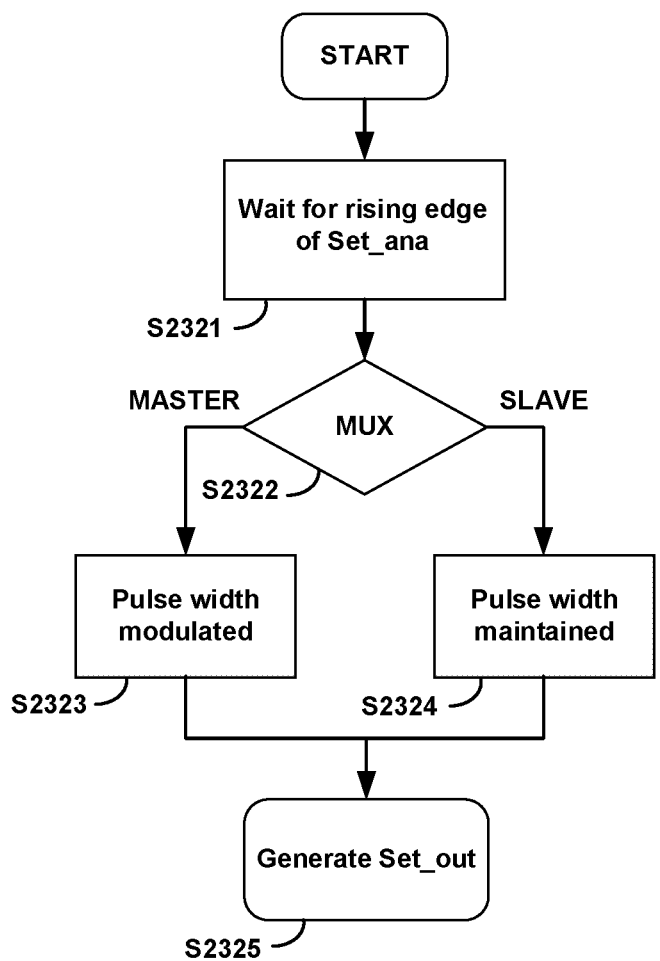
FIG. 9 is a working flowchart of the signal modulator 2032 in accordance with an embodiment of the present invention.

FIG. 9 is a working flowchart of the signal modulator 2032 in accordance with an embodiment of the present invention. It includes steps S2321 to S2325. In step S2321, the signal modulator 2032 waits for a rising edge of the turn-on control signal Set_ana, and enters into step S2322 once the rising edge is detected. In step S2322, it is determined whether the control IC is set as a master control IC or a slave control IC. If the control IC is set as a master control IC, the process will proceed to step S2323. The pulse width of the turn-on control signal Set_ana will be modulated (for example, in the way shown in FIG. 3B), to generate the preprocess signal Set_out in step S2325. If the control IC is set as a slave control IC, the process will go to step S2324, wherein the pulse width of the turn-on control signal Set_ana is kept unchanged, and the preprocess signal Set_out with its pulse width same with the turn-on control signal Set_ana is generated in step S2325.

Figure 10A:
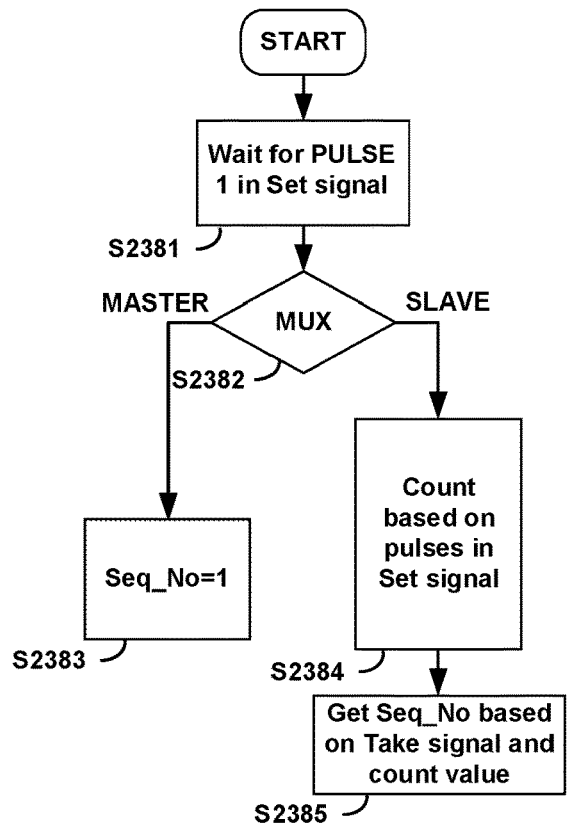
FIG. 10A is a working flowchart of the sequence calculator 2038 in accordance with an embodiment of the present invention.

FIG. 10A is a working flowchart of the sequence calculator 2038 in accordance with an embodiment of the present invention. It includes steps S2381 to S2385. In step S2381, the sequence calculator 2038 waits for PULSE 1 in the phase control signal Set, and enters into step S2382 once PULSE 1 is detected. In step S2382, it is determined whether the control IC is set as a master control IC or a slave control IC. If the control IC is configured as a master control IC, the process will go to step S2383 and set Seq_No to "1". Else if the control IC is configured as a slave control IC, the process will go to step S2384 and start counting based on pulses in the phase control signal Set. Then, in step S2385, the Seq_No is obtained based on the phase input signal Take and a count value.

Figure 10B:
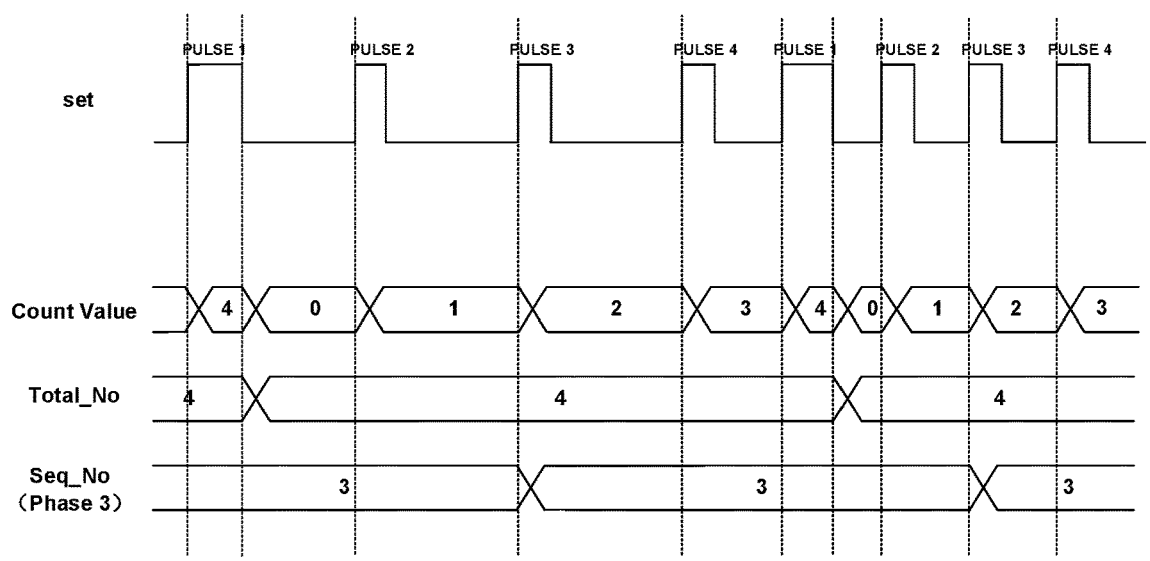
FIG. 10B show operation waveforms of the sequence calculator 2038 in a four-phase switching converter in accordance with an embodiment of the invention.

FIG. 10B show operation waveforms of the sequence calculator 2038 in a four-phase switching converter in accordance with an embodiment of the present invention, wherein the control IC is used in the third phase, and its corresponding Seq_No is 3. As can be seen from FIG. 10B, through counting the pulses in the phase control signal Set, not only the sequence information, but also the total phase number of the switching converter could be obtained.

Figure 11A:
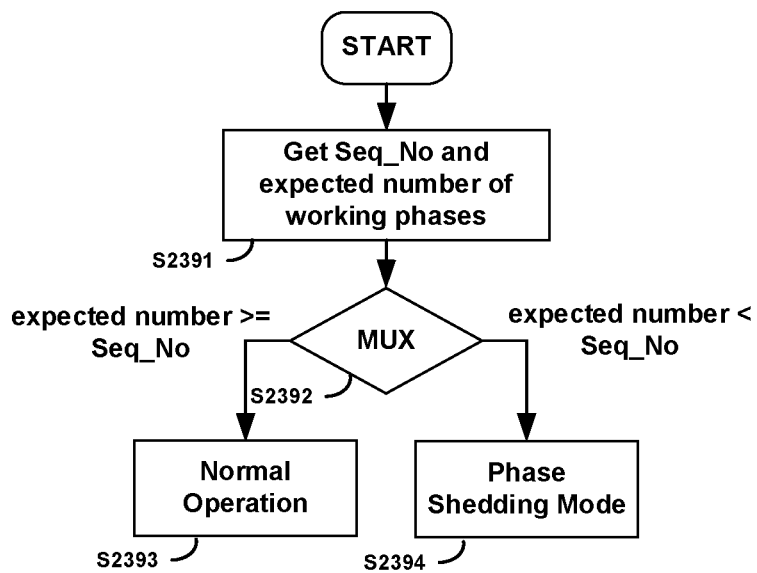
FIG. 11A is a working flowchart of the phase shedding controller 2039 in accordance with an embodiment of the present invention.

FIG. 11A is a working flowchart of the phase shedding controller 2039 in accordance with an embodiment of the present invention. It includes steps S2391 to S2394. In step S2391, Seq_No and an expected number of working phases (i.e. number of phases working to provide power to the load) are got. The expected number of working phases could be derived from the phase shedding command, which is provided by the host controller through the communication bus. In step S2392, the expected number of working phases is compared with Seq_No. If the expected number of working phases is greater than or equal to Seq_No, the process will enter into step S2393, wherein the switch control circuit works normally, and based on the phase input signal Take and the phase control signal Set, stimulates the corresponding power unit to provide power to the load. If the expected number of working phases is less than Seq_No, the process will go to step S2394, and the switch control circuit will enter a phase shedding mode. In the phase shedding mode, the switch control signal PWM maintains a high impedance state to disable the power unit. The transistors HS and LS are both turned off to stop providing power to the load. Meanwhile, the phase output signal Pass is set to be equal to the phase input signal Take.

Figure 11B:
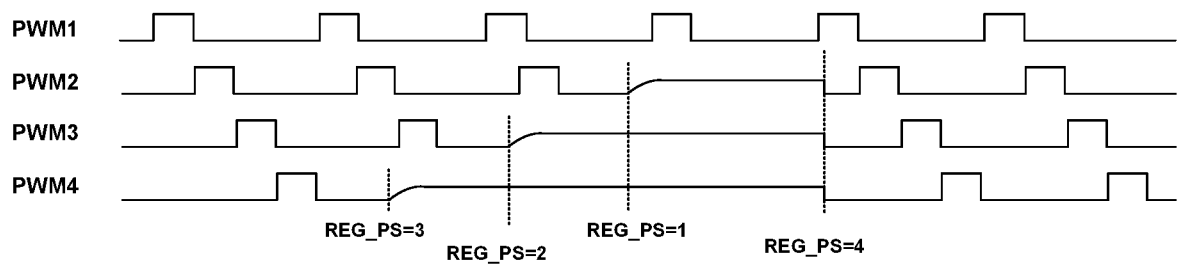
FIG. 11B show operation waveforms of the phase shedding controller 2039 in a four-phase switching converter in accordance with an embodiment of the invention.

FIG. 11B show operation waveforms of the phase shedding controller 2039 in a four-phase switching converter in accordance with an embodiment of the invention. REG_PS is a register in the register circuit 2035, and the host controller writes data into REG_PS through the communicate bus to realize phase shedding control. As shown in FIG. 11B, when the host controller writes data "3" into REG_PS, which means the expected number of working phases is 3, the control ICs with Seq_No of 1 to 3 work normally, while the control IC with Seq_No of 4 enters the phase shedding mode. Accordingly, when the host controller writes "2" into REG_PS, which means the expected number of working phases is 2, the control ICs with Seq_No of 1 and 2 work normally, while the control ICs with Seq_No of 3 and 4 enter the phase shedding mode. When the host controller writes "1" into REG_PS, it means the expected number of working phases is 1. Thus all control ICs, except the one with Seq_No of 1 (i.e. the master control IC) enters the phase shedding mode. When the host controller writes "4" into REG_PS, all control ICs resumes into normal operation.

Figure 11C:
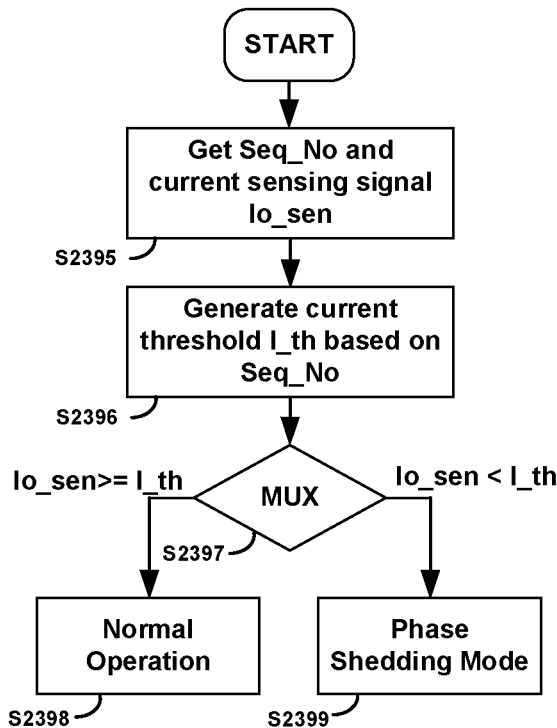
FIG. 11C is a working flowchart of the phase shedding controller 2039 in accordance with another embodiment of the present invention.

FIG. 11C is a working flowchart of the phase shedding controller 2039 in accordance with another embodiment of the present invention. It includes steps S2395 to S2399. In step S2395, the sequence information Seq_No, and a current sensing signal Io_sen indicative of an output current of multiphase switching converter, are obtained. In step S2396, a current threshold I_th is generated based on the sequence information Seq_No. The current threshold I_th can be generated through one or more of calculation, look-up table, signal conversion, etc. In general, the larger the Seq_No, the higher the current threshold I_th. In step S2397, the current sensing signal Io_sen is compared with the current threshold I_th. If the current sensing signal Io_sen is greater than or equal to the current threshold I_th, the process will proceed to step S2398, and the switch control circuit will work normally. Else if the current sensing signal Io_sen is less than the current threshold I_th, the process will proceed to step S2399, wherein the switch control circuit enters the phase shedding mode to disable the power unit. It can be easily understood by people of ordinary skills in the art that, a hysteresis comparison is often adopted in step S2397. The working principle of hysteresis comparison is well known in the art, thus not described here for simplicity.

In some embodiments, to ensure safe operation of the multiphase switching converter, phase shedding mode of the master control IC is blocked. That is, the master control IC will not enter the phase shedding mode in any case.

Figure 12:
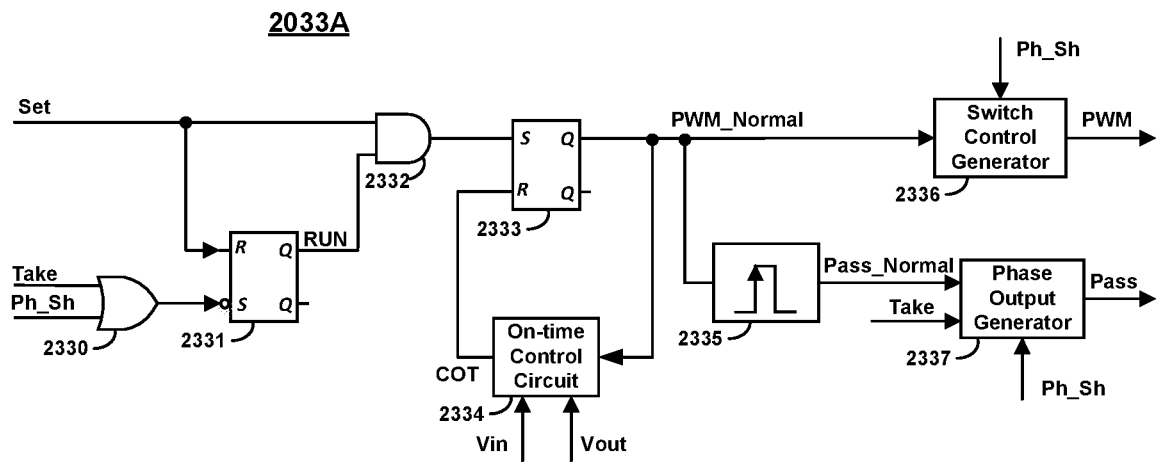
FIG. 12 is a schematic block diagram of a switch control circuit 2033A in accordance with an embodiment of the present invention.

FIG. 12 is a schematic block diagram of a switch control circuit 2033A in accordance with an embodiment of the present invention. The switch control circuit 2033A includes an OR gate 2330, RS flip-flops 2331, 2333, an AND gate 2332, an on-time control circuit 2334, a one-shot circuit 2335, a switch control generator 2336 and a phase output generator 2337. In this embodiment, a constant on-time control method is adopted. Under normal operation, at the falling edge of the phase input signal Take, the flip-flop 2331 is set and its output signal RUN is changed into logical high. After that, when the phase control signal Set changes from logical low into logical high, the flip-flop 2333 is set and its output signal PWM_Normal is changed into logical high. At the same time, the signal Pass_Normal also becomes high. The flip-flop 2333 will be reset by the on-time control circuit 2334 after a time period TON. This time period is usually determined by the input voltage Vin and output voltage Vout of the multiphase switching converter.

The switch control generator 2336 generates the switch control signal PWM based on the signal PWM_Normal and the phase shedding control signal Ph_Sh. Under normal operation, the switch control signal PWM is equal to PWM_Normal. In the phase shedding mode, the switch control signal PWM is set to a high impedance state, so the power unit is disabled, and both the transistors HS and LS are off.

The phase output generator 2337 generates the phase output signal Pass based on the signal Pass_Normal, the phase input signal Take and phase shedding control signal Ph_Sh. Under normal operation, the phase output signal Pass is equal to Pass_Normal. In the phase shedding mode, the phase output signal Pass is equal to the phase input signal Take.

Figure 13:
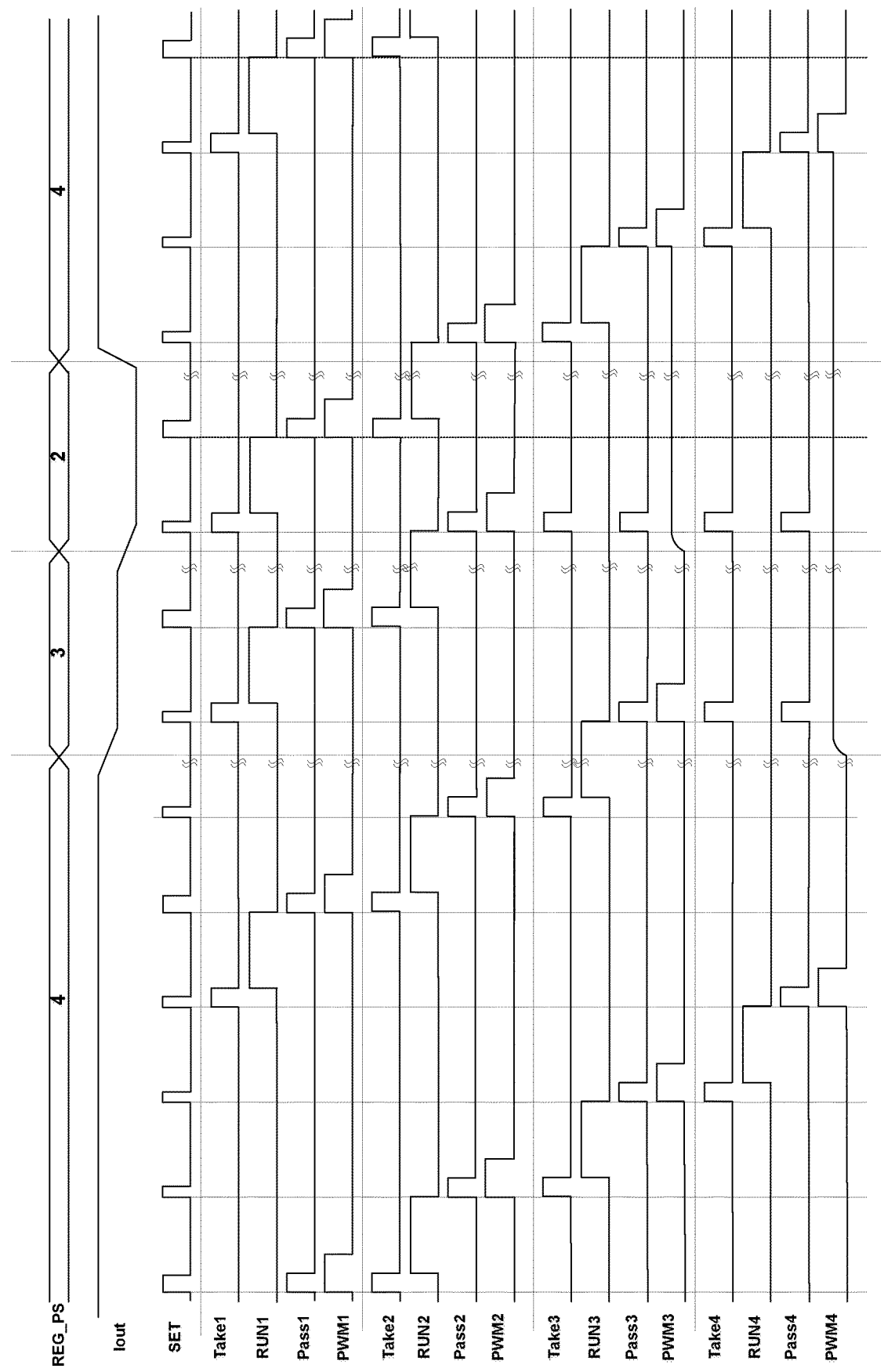
FIG. 13 show operation waveforms of a four-phase switching converter in accordance with an embodiment of the invention.

FIG. 13 show operation waveforms of a four-phase switching converter in accordance with an embodiment of the invention, wherein logic signals in the control ICs and their state changes in the phase shedding mode are all illustrated.

Although switching circuits are all configured in synchronous BUCK in the foregoing embodiments, it can be understood by those skilled in the art that, the switching circuit can also adopt other topologies, such as asynchronous BUCK, BOOST, BUCK-BOOST, etc. The transistors contained therein could also use other suitable controllable semiconductor transistors, besides MOSFET. These transistors can be discrete devices, or integrated together with the corresponding control circuit and driver circuit. In some applications, inductors and capacitors in switching circuits can also be integrated. Moreover, the switch control circuit can adopt control methods other than the constant on time control. These modifications are easy to be understood by people of ordinary skills in the art, thus do not depart from the scope of the present invention.

Figure 14:
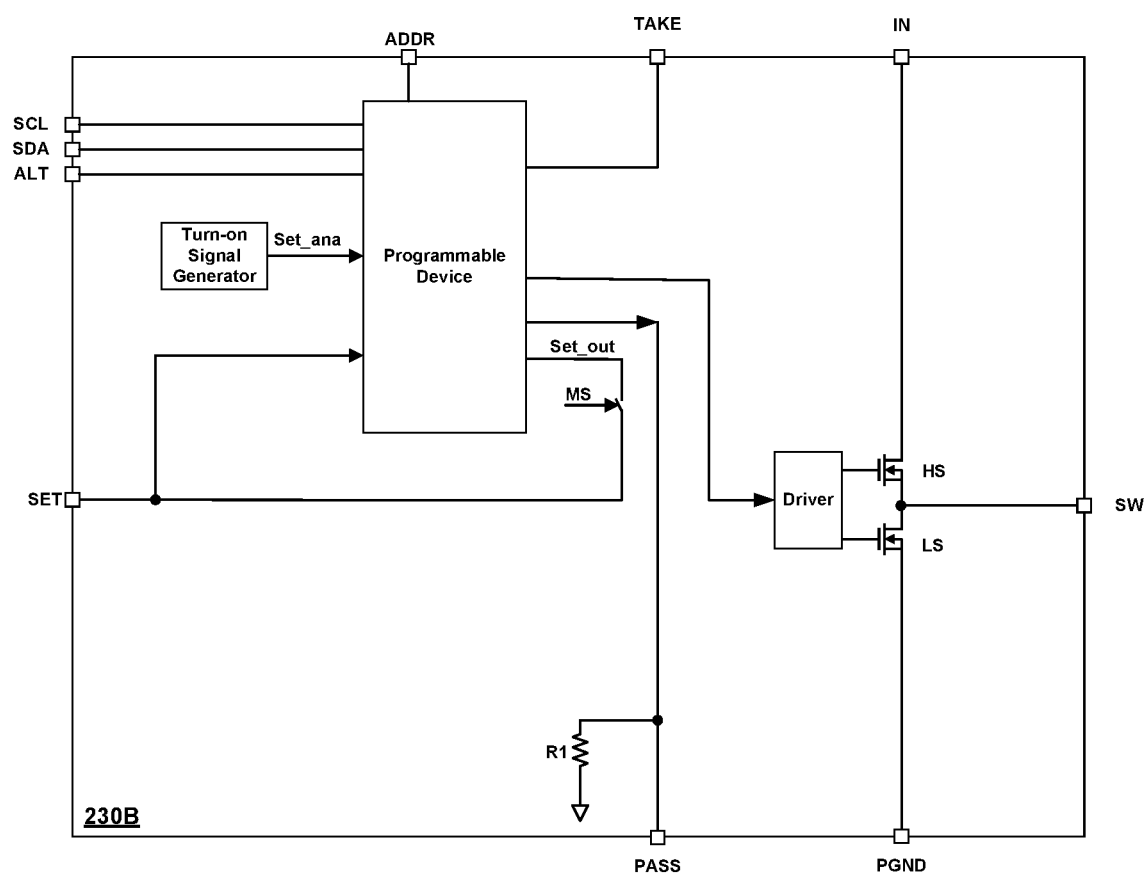
FIG. 14 is a schematic block diagram of a control IC 230B used in a multiphase switching converter in accordance with an embodiment of the present invention.

Moreover, for ease of description, the control circuit in the aforementioned embodiments is divided and illustrated in functional blocks, but this is not used to limit the invention. Some of the blocks in the control circuit, such as the turn-on signal generator 1011 and the signal modulator 1012 in the embodiment shown in FIG. 4, may be implemented by discrete devices or chips. Some blocks may be partially combined and realized by digital signal processing circuits or programmable devices (e.g. PLA, PAL, GAL, EPLD, CPLD, FPGA, etc.). FIG. 14 is a schematic block diagram of a control IC 230B used in a multiphase switching converter in accordance with an embodiment of the present invention. Compared with the embodiment of FIG. 7, the programmable device in FIG. 14 realizes functions of the master slave detection circuit, the signal modulator, the switch control circuit, the communication circuit, the register circuit, the total phase number calculator, the sequence calculator and the phase shedding controller.

Although modulation of the phase control signal in the master control circuit, and the sequence analysis based on the phase control signal in the slave control circuits can be carried out continuously and circularly, it is not absolutely necessary. In some embodiments, the multiphase switching converter has a normal operation mode and a sequence assignment mode. In normal operation mode, the pulses in the phase control signal output by the master control circuit have the same pulse width (such as the preset pulse width $T_{SET}$ in FIGS. 3A and 3B) and pulse amplitude. In the sequence assignment mode, the master control circuit modulates the pulse width or pulse amplitude of the pulses to generate the sequence information. The multiphase switching converter can enter the sequence assignment mode when it is just powered or in other necessary situations.

In some of the foregoing embodiments, the switch control signal changes to a high impedance state in the phase shedding mode. When detecting this high impedance state, the driver circuit turns off transistors in the corresponding switching circuit to stop providing power to the load. People of ordinary skills can recognize that, however, other suitable ways could also be used to disable the corresponding switching circuit. Furthermore, when the switching circuit gets disabled, the transistors in the switching circuit do not have to be turned off simultaneously. For a synchronous BUCK, the high side transistor can be turned off first, and the low side transistor can be turned off later, when a zero cross of inductor current is detected.

In some embodiments, a voltage level between a threshold voltage Vth1 (e.g. 2V) and a power supply voltage Vcc (e.g. 3.3V) is considered as logical high ("1"), a voltage level between zero voltage (0 V) and a threshold voltage Vth2 (e.g. 1V) is considered as logical low ("0"), and a voltage level between the threshold voltage Vth2 and Vth1 is considered as an intermediate level. A high impedance state refers to an output state of a digital circuit, which is neither logical high nor logical low. If this high impedance state is provided to a downstream circuit, its voltage level will be wholly determined by the downstream circuit, thus might be any of the logical high, logical low and intermediate levels.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A multiphase switching converter comprising:
a plurality of switching circuits coupled in parallel between an input voltage and a load; and
a plurality of control circuits configured in a daisy chain, wherein each of the control circuits has a first terminal, a second terminal and a third terminal, and is respectively coupled to a corresponding one of the plurality of switching circuits for providing a switch control signal, and wherein the first terminals of the plurality of control circuits are coupled together to share a phase control signal, the second terminal of each control circuit is coupled to a previous control circuit in the daisy chain to receive a phase input signal, and the third terminal of each control circuit is coupled to a latter control circuit in the daisy chain to provide a phase output signal; wherein
one of the plurality of control circuits is configured as a master control circuit to provide the phase control signal, and each of the remaining plurality of control circuits are respectively configured as a slave control circuit to receive the phase control signal; and wherein the phase control signal includes a plurality of pulses for successively triggering the plurality of switching circuits to provide power to the load, the plurality of pulses are modulated to respectively generate a corresponding sequence information for each slave control circuit, and each slave control circuit obtains the corresponding sequence information based on the received phase input signal and phase control signal.

2. The multiphase switching converter of claim 1, wherein each pulse of the plurality of pulses in the phase control signal has a different pulse width or a different pulse amplitude among the plurality of pulses, and wherein each slave control circuit samples a pulse in the phase control signal based on the received phase input signal, and obtains the corresponding sequence information in accordance with the pulse width or pulse amplitude of the sampled pulse.

3. The multiphase switching converter of claim 1, wherein the plurality of pulses of the phase control signal are modulated to have a first pulse with a pulse width or a pulse amplitude different from each of the remaining plurality of pulses, each slave control circuit monitors the phase control signal and starts counting the pulses when the first pulse is detected, and wherein based on the received phase input signal and a count value, each slave control circuit obtains the corresponding sequence information.

4. The multiphase switching converter of claim 1, wherein the plurality of control circuits are all coupled to a communication bus to receive a command from a host controller, wherein each slave control circuit, based on the corresponding sequence information and the command, determines whether to stop the corresponding switching circuit from providing power to the load.

5. The multiphase switching converter of claim 1, wherein each slave control circuit generates a current threshold based on the corresponding sequence information, and compares a current sensing signal indicative of an output current of the multiphase switching converter with the current threshold, to determine whether to stop the corresponding switching circuit from providing power to the load.

6. The multiphase switching converter of claim 1, wherein each control circuit comprises:
a master control unit configured to generate the phase control signal;
a slave control unit configured to obtain the sequence information based on the phase input signal and the phase control signal;
a master slave detection circuit configured to determine whether a corresponding control circuit is configured as a master control circuit or a slave control circuit, and generate a master slave detection signal to control the master control unit and the slave control unit; and
a switch control circuit configured to generate the switch control signal and phase output signal based on the phase control signal and the phase input signal.

7. The multiphase switching converter of claim 1, having a normal operation mode and a sequence assignment mode, wherein:
in the normal operation mode, the plurality of pulses in the phase control signal have same pulse width and same pulse amplitude; and
in the sequence assignment mode, pulse width or pulse amplitude of the plurality of pulses in the phase control signal are modulated to generate the corresponding sequence information for each slave control circuit.

8. A sequence assignment method used in a multiphase switching converter, wherein the multiphase switching converter includes a plurality of switching circuits coupled in parallel between an input voltage and a load, and a plurality of control circuits configured in a daisy chain, each of the control circuit has a first terminal, a second terminal and a third terminal, and is respectively coupled to a corresponding one of the plurality of switching circuits for providing a switch control signal, and wherein the first terminals of the plurality of control circuits are coupled together to share a phase control signal, the second terminal of each control circuit is coupled to a previous control circuit in the daisy chain to receive a phase input signal, and the third terminal of each control circuit is coupled to a latter control circuit in the daisy chain to provide a phase output signal, the sequence assignment method comprises:

configuring one of the control circuits as a master control circuit to provide the phase control signal, wherein the phase control signal has a plurality of pulses for successively triggering the plurality of switching circuits to provide power to the load;

respectively configuring each of the remaining plurality of control circuits as a slave control circuit to receive the phase control signal;

modulating the plurality of pulses in the phase control signal, through the master control circuit, to respectively generate a corresponding sequence information for each slave control circuit; and obtaining the corresponding sequence information, through each slave control circuit, based on the received phase input signal and the phase control signal.

9. The sequence assignment method of claim 8, wherein each pulse of the plurality of pulses in the phase control signal has a different pulse width or a different pulse amplitude among the plurality of pulses, and wherein each slave control circuit samples a pulse in the phase control signal based on the received phase input signal, and obtains the corresponding sequence information in accordance with the pulse width or pulse amplitude of the sampled pulse.

10. The sequence assignment method of claim 8, wherein the plurality of pulses of the phase control signal are modulated to have a first pulse with a pulse width or a pulse amplitude different from each of the remaining plurality of pulses, each slave control circuit monitors the phase control signal and starts counting the pulses when the first pulse is detected, and wherein based on the received phase input signal and a count value, each slave control circuit obtains the corresponding sequence information.

11. The sequence assignment method of claim 8, wherein the plurality of control circuits are all coupled to a communication bus to receive a command from a host controller, wherein each slave control circuit, based on the corresponding sequence information and the command, determines whether to stop the corresponding switching circuit from providing power to the load.

12. The sequence assignment method of claim 8, wherein each slave control circuit generates a current threshold based on the corresponding sequence information, and compares a current sensing signal indicative of an output current of the multiphase switching converter with the current threshold to determine whether to stop the corresponding switching circuit from providing power to the load.

13. A control circuit adapted to be configured in daisy chain and adapted to be used in a multiphase switching converter with a plurality of switching circuits coupled in parallel, wherein the control circuit comprises:

a first terminal configured to share a phase control signal;

a second terminal configured to receive a phase input signal from a previous control circuit in the daisy chain; and a third terminal configured to provide a phase output signal to a latter control circuit in the daisy chain; wherein if the control circuit is configured as a master control circuit, the control circuit will provide the phase control signal at the first terminal, and modulate a plurality of pulses in the phase control signal to respectively generate a corresponding sequence information for each slave control circuit in the daisy chain; and wherein if the control circuit is configured as a slave control circuit, the control circuit will receive the phase control signal at the first terminal, and obtain the corresponding sequence information based on the phase input signal and phase control signal.

14. The control circuit of claim 13, wherein each pulse of the plurality of pulses in the phase control signal has a different pulse width or a different pulse amplitude among the plurality of pulses, and wherein if the control circuit is configured as a slave control circuit, it the control circuit will sample a pulse in the phase control signal based on the phase input signal, and obtain the corresponding sequence information in accordance with the pulse width or pulse amplitude of the sampled pulse.

15. The control circuit of claim 13, wherein the plurality of pulses of the phase control signal are modulated to have a first pulse with a pulse width or a pulse amplitude different from each of the remaining plurality of pulses, and wherein if the control circuit is configured as a slave control circuit, the control circuit will monitor the phase control signal and start counting the pulses when the first pulse is detected, and further obtain the corresponding sequence information based on the phase input signal and a count value.

16. The control circuit of claim 13, further coupled to a communication bus to receive a command, wherein based on the corresponding sequence information and the command, the control circuit determines whether to stop a corresponding one of the plurality of switching circuits from providing power to a load.

17. The control circuit of claim 13, further configured to generate a current threshold based on the corresponding sequence information, and compare a current sensing signal indicative of an output current of the multiphase switching converter with the current threshold to determine whether to stop a corresponding one of the plurality of switching circuits from providing power to a load.

18. The control circuit of claim 13, further comprising:

a master control unit configured to generate the phase control signal;

a slave control unit configured to obtain the sequence information based on the phase input signal and the phase control signal;

a master slave detection circuit configured to determine whether the control circuit is configured as a master control circuit or a slave control circuit, and generate a master slave detection signal to control the master control unit and the slave control unit; and a switch control circuit configured to generate the phase output signal, and a switch control signal for controlling a corresponding one of the plurality of switching circuits based on the phase control signal and the phase input signal.

19. The control circuit of claim 18, wherein the master control unit comprises:

a turn-on signal generator configured to generate a turn-on control signal;

a signal modulator coupled to the turn-on signal generator, and configured to generate a preprocess signal based on the turn-on control signal; and a switch having a first terminal, a second terminal and a control terminal, wherein the first terminal is coupled to the signal modulator to receive the preprocess signal, the second terminal is coupled to the first terminal of the control circuit, and the control terminal is coupled to the master slave detection circuit to receive the master slave detection signal.

20. The control circuit of claim 18, wherein the slave control unit comprises:

a sequence calculator configured to obtain the sequence information based on the phase control signal and the phase input signal; and a phase shedding controller coupled to the sequence calculator, wherein based on the sequence information, the phase shedding controller generates a phase shedding control signal to control the switch control circuit.

21. A control method used in a control circuit, wherein the control circuit is adapted to be configured in daisy chain and adapted to be used in a multiphase switching converter with a plurality of switching circuits coupled in parallel, the control circuit has a first terminal, a second terminal and a third terminal, wherein the first terminal is configured to share a phase control signal, the second terminal is configured to receive a phase input signal from a previous control circuit in the daisy chain, and the third terminal is configured to provide a phase output signal to a latter control circuit in the daisy chain, the control method comprises:

determining whether the control circuit is configured as a master control circuit or a slave control circuit; wherein if the control circuit is configured as a master control circuit, providing the phase control signal at the first terminal of the control circuit, and modulating a plurality of pulses in the phase control signal to respectively generate a corresponding sequence information for each slave control circuit in the daisy chain; and wherein if the control circuit is configured as a slave control circuit, receiving the phase control signal at the first terminal of the control circuit, and obtaining the corresponding sequence information based on the phase input signal and phase control signal.

22. The control method of claim 21, wherein each pulse of the plurality of pulses in the phase control signal has a different pulse width or a different pulse amplitude among the plurality of pulses, and wherein if the control circuit is configured as a slave control circuit, the control circuit will sample a pulse in the phase control signal based on the phase input signal, and obtain the corresponding sequence information in accordance with the pulse width or pulse amplitude of the sampled pulse.

23. The control method of claim 21, wherein the plurality of pulses of the phase control signal are modulated to have a first pulse with a pulse width or a pulse amplitude different from each of the remaining plurality of pulses, and wherein if the control circuit is configured as a slave control circuit, the control circuit will monitor the phase control signal to start counting when the first pulse is detected, and obtain the corresponding sequence information in accordance with the phase input signal and a count value.

24. The control method of claim 21, further comprising:

receiving a command from a host controller through a communication bus; and determining whether to stop a corresponding one of the plurality of switching circuits from providing power to a load based on the corresponding sequence information and the command.

25. The control method of claim 21, further comprising:

generating a current threshold based on the corresponding sequence information, and comparing a current sensing signal indicative of an output current of the multiphase switching converter with the current threshold to determine whether to stop a corresponding one of the plurality of switching circuits from providing power to a load.

26. A control circuit adapted to be configured in daisy chain and adapted to be used in a multiphase switching converter with a plurality of switching circuits coupled in parallel, wherein the control circuit comprises:

a first terminal configured to share a phase control signal with;

a second terminal configured to receive a phase input signal from a previous control circuit in the daisy chain; and a third terminal configured to provide a phase output signal to a latter control circuit in the daisy chain; wherein the control circuit is configured to generate the phase output signal, and a switch control signal for controlling a corresponding one of the plurality of switching circuits based on the phase input signal and phase control signal; and wherein:

if the control circuit is configured as a master control circuit, the control circuit will provide the phase control signal at the first terminal, the phase control signal includes a plurality of pulses for successively triggering the plurality of switching circuits, and the plurality of pulses includes a first pulse with a pulse width larger than pulse width of each of the remaining plurality of pulses, and wherein the pulse width of each of the remaining plurality of pulses are the same.

27. The control circuit of claim 26, wherein if the control circuit is configured as a slave control circuit, the control circuit will receive the phase control signal at the first terminal and start counting the pulses when the first pulse is detected, and further obtain the corresponding sequence information based on the phase input signal and a count value.

28. The control circuit of claim 27, further coupled to a communication bus to receive a command, wherein based on the corresponding sequence information and the command, the control circuit determines whether to stop a corresponding one of the plurality of switching circuits from providing power to a load.

29. The control circuit of claim 27, further configured to generate a current threshold based on the corresponding sequence information, and compare a current sensing signal indicative of an output current of the multiphase switching converter with the current threshold to determine whether to stop a corresponding one of the plurality of switching circuits from providing power to a load.

* * * * *